(12) United States Patent
Page

(10) Patent No.: US 6,234,740 B1
(45) Date of Patent: May 22, 2001

(54) VEHICLE CARGO LIFT

(75) Inventor: Robert Leonard George Page, Taren Point (AU)

(73) Assignee: Workman Industries Pty. Ltd, Taren Point (AU)

(*) Notice: Subject to any disclaimer, the term of this patent is extended or adjusted under 35 U.S.C. 154(b) by 0 days.

(21) Appl. No.: 09/424,688

(22) PCT Filed: May 29, 1998

(86) PCT No.: PCT/AU98/00400

§ 371 Date: Mar. 27, 2000

§ 102(e) Date: Mar. 27, 2000

(87) PCT Pub. No.: WO98/54026

PCT Pub. Date: Dec. 3, 1998

(30) Foreign Application Priority Data

May 29, 1997 (AU) .................................................. PO 7079

(51) Int. Cl.[7] ...................................................... B60P 1/46
(52) U.S. Cl. .......................... 414/545; 414/529; 414/460; 254/2 R; 187/254
(58) Field of Search .................................... 414/539, 540, 414/544, 541, 545, 556, 921, 592, 460, 812, 529, 495; 254/2 R; 187/222, 274

(56) References Cited

U.S. PATENT DOCUMENTS

| | | | |
|---|---|---|---|
| 3,266,646 | * 8/1966 | Byrne et al. | 414/545 |
| 3,870,126 | * 3/1975 | Himes | 414/545 X |
| 3,887,092 | 6/1975 | Leet . | |
| 4,081,091 | * 3/1978 | Thorley | 414/545 |
| 4,930,969 | 6/1990 | Langer . | |
| 5,176,486 | 1/1993 | Park . | |
| 5,630,693 | 5/1997 | Sobina . | |

FOREIGN PATENT DOCUMENTS

| | | | |
|---|---|---|---|
| 41468/72 | 4/1971 | (AU) . | |
| 0132561 | * 10/1978 | (DE) | 414/545 |
| 2299791 | 2/1996 | (GB) . | |
| 0074739 | * 4/1988 | (JP) | 414/545 |
| 8800538 | * 1/1988 | (WO) | 414/529 |
| PCT/GB97/02474 | 9/1997 | (WO) . | |

* cited by examiner

Primary Examiner—Frank E. Werner
(74) Attorney, Agent, or Firm—Paul & Paul

(57) ABSTRACT

This invention relates to a vehicle cargo lift having a bed (9) having posts (10) parallel to each other extending from the bed (9), a support frame (2) having two opposed side frames forming a well therebetween to accommodate the bed (9), at least one hollow elongated member (7) located in each side frame, drive devices (8) to move the bed (9) between a raised transport position and a ground engaging loading positions such that the bed (9) retains substantially the same orientation throughout its movement between the transport position and the loading position with the hollow elongated members (7) being telescopically engaged with respective posts (10) of the bed (9).

14 Claims, 3 Drawing Sheets

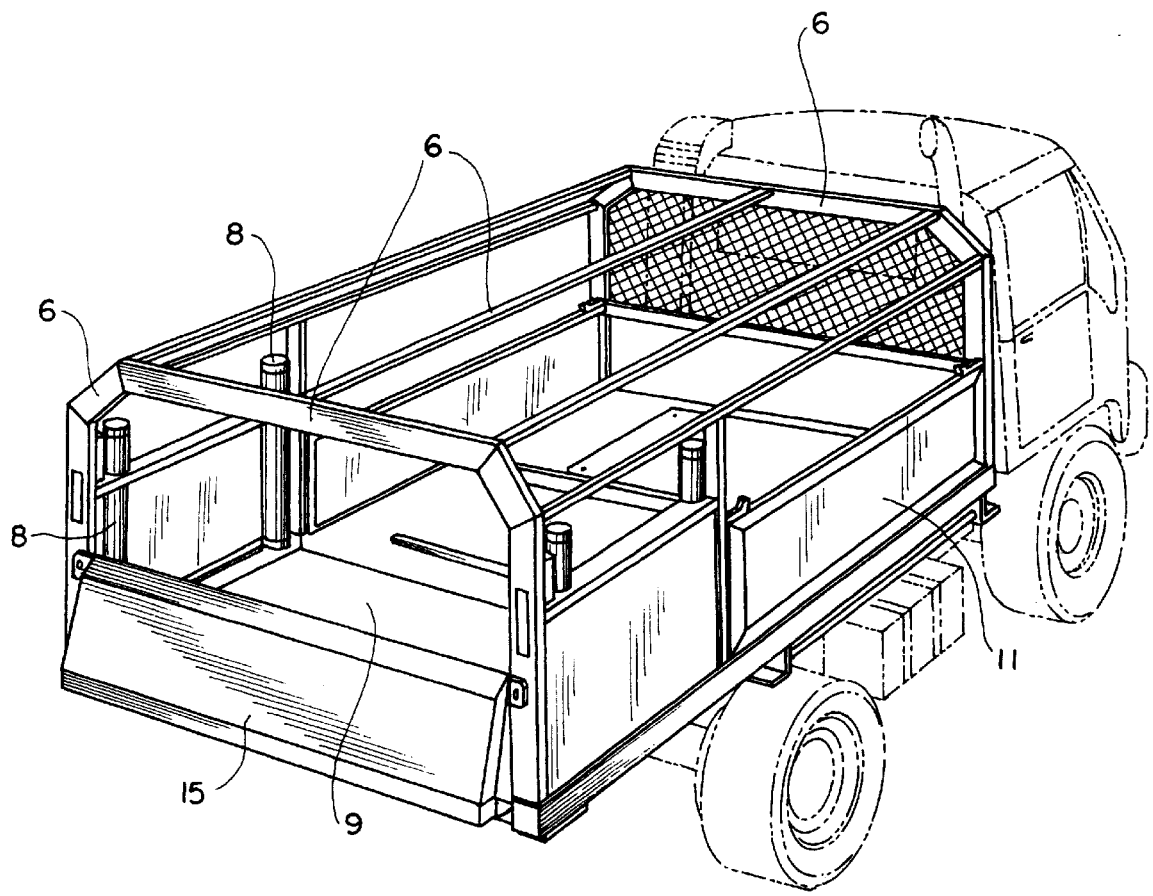
F I G. 2

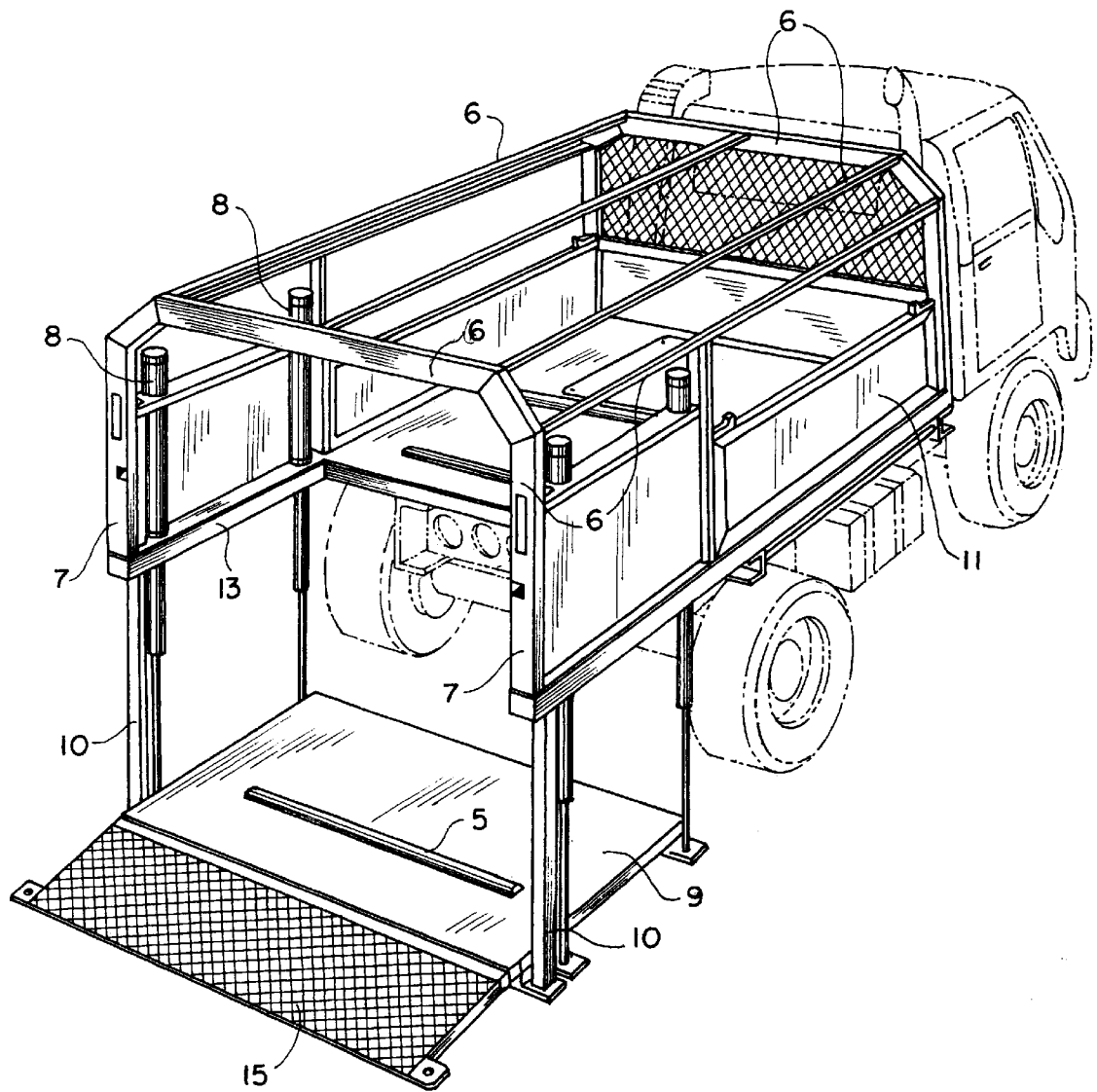
F I G. 3

VEHICLE CARGO LIFT

BACKGROUND OF THE INVENTION

The present invention relates to an attachment which can be fitted to an existing vehicle, either powered or non powered, or a vehicle chassis, said attachment having a tray which is adapted to be raised and lowered from a transport position to a ground engaging loading position.

Standard vehicles such as vans and trucks have been used for the transportation of cargo. However, because of the height of the tray or bed above the ground, loading, unloading and positioning of cargo can be difficult, especially with heavy objects.

Forklifts and ramps have been used. But these have their disadvantages such as costs and availability at sites.

Attempts have been made to overcome these problems by providing a modified U-shaped chassis with the rear wheels attached by means of stub axles, and an adjustable tray connected by parallelogram linkages between the arms of the chassis, to be raised and lowered between a ground engaging loading position and a raised transport position. Further attempts have used a modified U-shaped chassis with the rear wheels attached by means of stub axles, and a tilting tray connected between the arms of the chassis.

These attempts require an completely modified chassis with the resultant costs. With some vehicles and usage such an expense cannot be justified.

Other attempts to overcome this problem involve the use of lifting tailgates. However these are not always suitable because of the method of attachment and the operation of the tailgate external of the vehicle.

SUMMARY OF THE INVENTION

The present invention seeks to ameliorate these problems by providing a vehicle cargo lift comprising:

a bed having posts parallel to each other extending from said bed;

a support frame adapted to be connected to a vehicle, said support frame comprising two opposed side frames forming a well therebetween to accommodate the bed;

at least one elongated member located in each side frame; and drive means to move said bed between a raised transport position, and a ground engaging loading position such that the bed retains substantially the same orientation throughout its movement between said transport position and said loading position, with said elongated members being telescopically engaged with respective posts of the bed.

In another form the invention comprises a combined tray and vehicle cargo lift for fitting to the chassis of a vehicle behind the cab, comprising:

a tray adapted to be fitted onto a standard chassis of a vehicle;

a support frame; having a front frame, two opposed side frames and a roof frame; extending over the tray;

a bed having posts parallel to each other extending from said bed;

a rear portion of the frame having a well formed therebetween, so as to accommodate the bed;

at least one elongated member extending from each side frame of the rear portion of the frame; and drive means to move said bed between a raised transport position and a ground engaging loading position such that the bed retains substantially the same orientation throughout its movement between said transport position and said loading position, with said elongated members being telescopically engaged with respective posts of the bed.

The present invention will now be described, by way of example, with reference to the accompanying drawings.

BRIEF DESCRIPTION OF THE DRAWINGS

FIG. 2 illustrates schematically the combined tray and cargo lift according to one embodiment of the present invention; with the lift in the transport stage; and FIG. 3 illustrates schematically the combined tray and cargo lift according to one embodiment of the present invention; as shown in FIG. 2, with the lift in the loading stage.

DETAILED DESCRIPTIONS OF THE PREFERRED EMBODIMENTS

Figure 1:
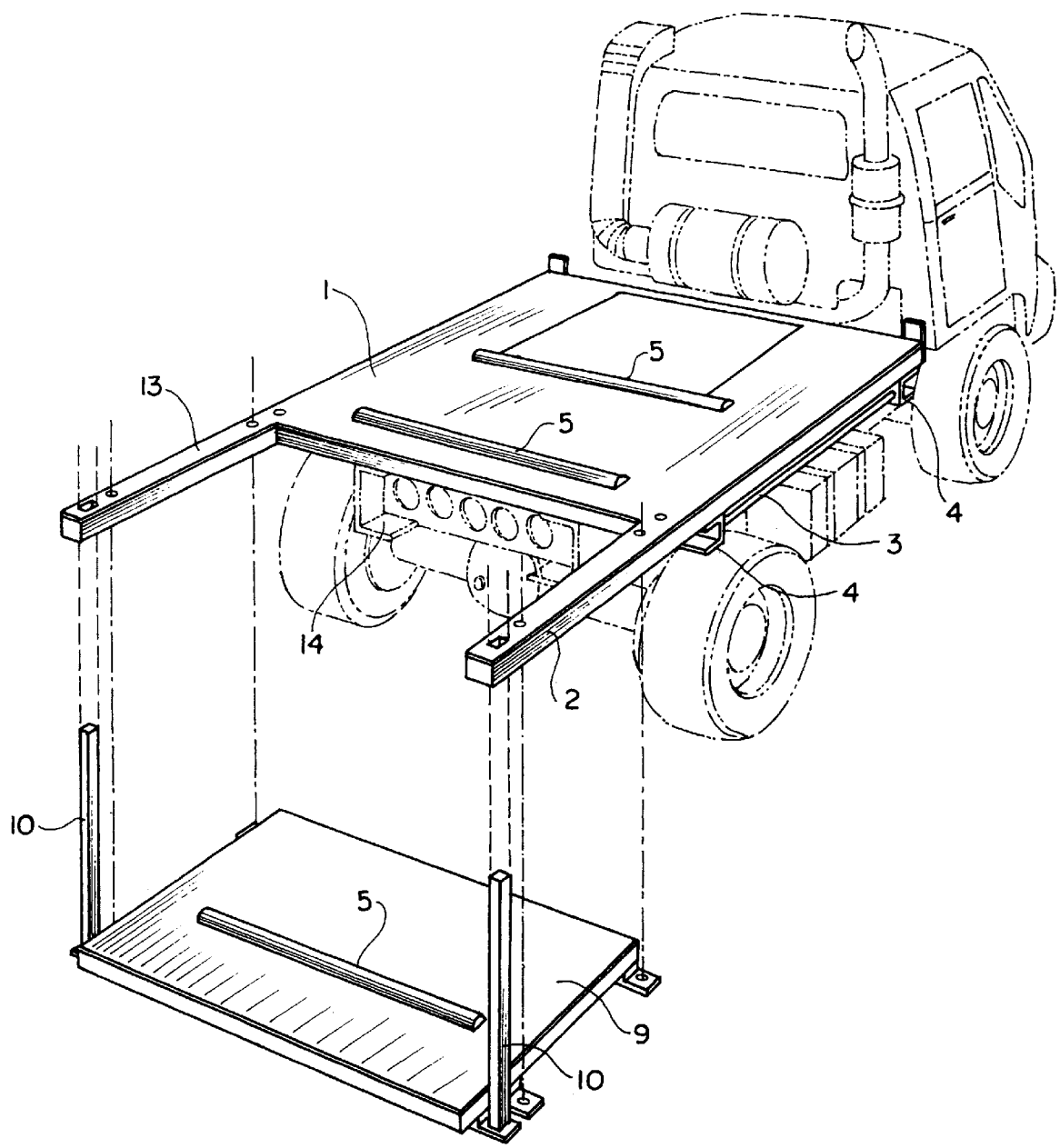
FIG. 1 illustrates schematically a perspective exploded view of a combined tray and cargo lift, without the over frame, according to one embodiment of the present invention.

An embodiment of the present invention is show in FIGS. 1–3 of the accompanying drawings, in which a combined tray and cargo lift is adapted to fit on a standard chassis (not shown).

The tray (1) and frame (2) are adapted to fit and be secured to a standard chassis (14) of a vehicle. The tray (1) is affixed to the normal connection points of a full rear axle assembly chassis (14), as supplied, by example, by Toyota.

In the embodiment as shown, the tray (1) is secured to the standard chassis (14) of a vehicle having a full rear axle, no modifications of a structural nature are required to the chassis. Depending upon the configuration of chassis, the tray and combination lift will provide a cheap and quick means of providing a cargo lift to the chassis of a vehicle than is presently available.

The embodiment, as shown in FIGS. 1–3, comprises a bottom frame (3) which is affixed to a standard chassis of a vehicle, whether powered or non powered, at any suitable points (4). The tray (1) has two rollers (5), which assist the movement of cargo onto the tray (1).

A support frame (2) is affixed to the tray (1). Extending beyond the rear of the tray (1), is lift frame (6), which is fully supported by the support frame (2). Each side of the lift frame (6) has a hollow member (7) and drive means (8) in this case several hydraulic rams, which are connected to the lift platform (9), as shown in FIG. 3.

The lift platform (9) has a post (10) on each side, which telescopically engages with the respective hollow member (7), so as to guide the lift platform (9) during its movements. Any suitable drive means could be used, but preferably two hydraulic rams (12) are used on each side of the lift platform (9), with the ram (12) extending through the bottom frame member (13). The lift frame (6) is fully supported by the support frame (2) providing a stable and fully supported structure.

In use, the lift platform (9) is lowered by the drive means (hydraulic rams) (8) to the ground engaging loading position, and the cargo moved onto the lift platform (9). To assist in the movement of the cargo, a roller (5) is located on the lift platform (9). The platform (9) is then raised, to the height of the tray (1), as shown in FIG. 2, and the cargo moved onto the tray (1). If required the lift platform (9)

could be then raised slightly above the height of the tray (1), to prevent backward movement of cargo. A tailgate/ramp (15) could be connected to the rear end of the lift platform (9), as shown in FIGS. 2 & 3. Further side panels (11) could be hingedly connected to the tray (1) to allow access to the side of the tray (1).

Whilst the present invention has been shown in a preferred embodiment there are many variations possible which would fall within the scope and the spirit of the present invention. The drive means could be worm drives or pneumatically driven rams. The post on the lift platform could be located on the centre of the platform side between two lifting rams or only one lifting ram per side could be used with any number of posts. Further the lift support could be a separate structure which is attached to an existing tray.

It should be obvious to people skilled in the art that modifications and alterations could be carried out to the above described invention without departing from the scope or spirit of the present invention.

I claim:

1. A vehicle cargo lift for use with a vehicle, the vehicle cargo lift comprising
   a lift platform having a front edge and a rear edge, said lift platform being adapted for being moved between a raised transport position and a ground engaging loading position;
   a support frame adapted for attachment to the vehicle, said support frame including a tray having a rear edge, said support frame further including a pair of bottom rails extending rearwardly and in parallel from either side of said rear edge of said tray, said pair of bottom rails defining a well therebetween so as to accommodate said lift platform,
      said tray forming a supporting surface for cargo carried on the vehicle, said rear edge of said tray being adjacent to said front edge of said lift platform when said lift platform is moved to said raised transport position;
   a pair of posts extending perpendicularly from either side of said lift platform, each of said posts passing through a hole in a respective one of said pair of bottom rails to thereby guide said lift platform in upward and downward movement;
   a rear arch frame spanning said well, said rear arch frame including at least one elongated member extending substantially perpendicularly upward from each of said pair of bottom rails;
   at least one pair of elongated members extending parallel to said pair of bottom rails from said rear arch frame; and
   drive means to move said lift platform between said raised transport position and said ground engaging loading position such that said lift platform retains substantially the same orientation throughout its movement between said transport position and said loading position, said drive means being supported by said pair of bottom rails and said pair of elongated members extending parallel to said pair of bottom rails.

2. A vehicle cargo lift according to claim 1, wherein said support frame further comprises a front arch frame joined to said rear arch frame by a roof frame.

3. A vehicle cargo lift according to claim 2, wherein said drive means extends through said pair of bottom rails to engage said lift platform.

4. A vehicle cargo lift according to claim 3, wherein said drive means comprises hydraulic cylinders.

5. A vehicle cargo lift according to claim 4, wherein said hydraulic cylinders includes two hydraulic cylinders on each side of said lift platform.

6. A vehicle cargo lift according to claim 5, wherein said lift platform further includes at least one transversely extending roller to assist the movement of cargo therealong.

7. A vehicle cargo lift according to claim 6, wherein said lift platform further includes a tailgate which can be closed when said lift platform further is in its transport position.

8. A combined tray and vehicle cargo lift for use with a vehicle, the vehicle having a chassis and a cab, the combined tray and vehicle cargo lift comprising:
   a tray adapted to be fitted onto the chassis of the vehicle, and having a front portion located adjacent the cab of the vehicle and a rear portion;
   a support frame having a front arch frame, a rear arch frame, a roof frame extending between said front and rear arch frames and over said tray, and two opposed side frames, each of said side frames including a bottom rail and an elongated member extending parallel to said bottom rail;
   a lift platform having posts parallel to each other extending upward from said lift platform, each of said posts extending through a respective hole formed in said bottom rail of a respective one of said side frames;
   said side frames defining a well to accommodate said lift platform;
   said rear arch frame including a pair of elongated members extending between each said bottom rail and said roof frame on either side of said well; and
   drive means to move said lift platform between a raised transport position and a ground engaging loading position such that said lift platform retains substantially the same orientation throughout its movement between said transport position and said loading position, with each of said elongated members extending between each said bottom rail and said roof frame being telescopically engaged with a respective one of said posts of said lift platform, said drive means being supported by said bottom rails and said elongated member parallel to said bottom rail of each of said side frames.

9. A combined tray and cargo lift according to claim 8, wherein said drive means extend through said bottom rail to engage said lift platform.

10. A combined tray and cargo lift according to claim 9, wherein said drive means comprises hydraulic cylinders.

11. A combined tray and cargo lift according to claim 10, wherein said hydraulic cylinders includes two hydraulic cylinders on each side of said lift platform.

12. A combined tray and cargo lift according to claim 11, wherein said tray and said lift platform have transversely extending rollers to assist the movement of cargo therealong.

13. A combined tray and cargo lift according to claim 12, wherein said lift platform has a tailgate which can be closed when said lift platform is in its transport position.

14. A combined tray and cargo lift according to claim 13, wherein said tray has a top surface, said lift platform in its transport position sits above said top surface of said tray.

* * * * *